Sheet 1, 2 Sheets.

E. T. Wheeler.
Sawing Shingles.

Nº 102,343.　　　　　　　Patented Apr. 26, 1870.

Witnesses:
John Becker
Wm A. Morgan

Inventor:
E. T. Wheeler
pr. Munn & Co
Attorneys

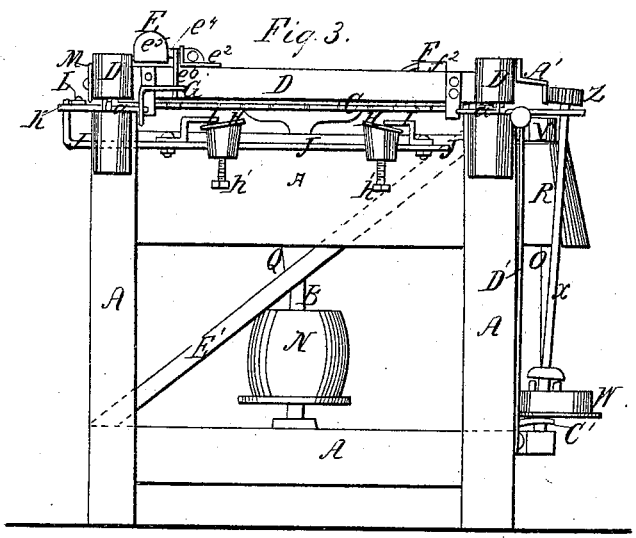

United States Patent Office.

EMERY T. WHEELER, OF CANNELTON, INDIANA, ASSIGNOR TO HIMSELF AND WILLIAM H. VAUGHAN, OF SAME PLACE.

Letters Patent No. 102,343, dated April 26, 1870.

---

IMPROVEMENT IN SHINGLE-MACHINE.

---

The Schedule referred to in these Letters Patent and making part of the same.

---

*To all whom it may concern:*

Be it known that I, EMERY T. WHEELER, of Cannelton, in the county of Perry and State of Indiana, have invented a new and useful Improvement in Shingle, Heading, and Boxing-Machine; and I do hereby declare that the following is a full, clear, and exact description thereof, which will enable others skilled in the art to make and use the same, reference being had to the accompanying drawings forming part of this specification, in which—

Figure 3 is an end view of the same.

Figure 4 is a detail sectional view of the same taken through the line $x\ x$, fig. 2.

Figure 5 is a detail view of the same.

Figure 6 is a detail sectional view of the same, taken through the line $y\ y$, fig. 2.

Figure 7 is a detail sectional view of the same taken through the line $z\ z$, fig. 6.

Similar letters of reference indicate like parts.

This invention relates to shingle, heading, and box-machines, and consists in a certain combination and arrangement of parts, which will be specified hereinafter.

A is the frame of the machine.

B is the saw-shaft, which is vertical, and which works in bearings attached to the frame A, so as to be in the center of said frame.

Figure 1:
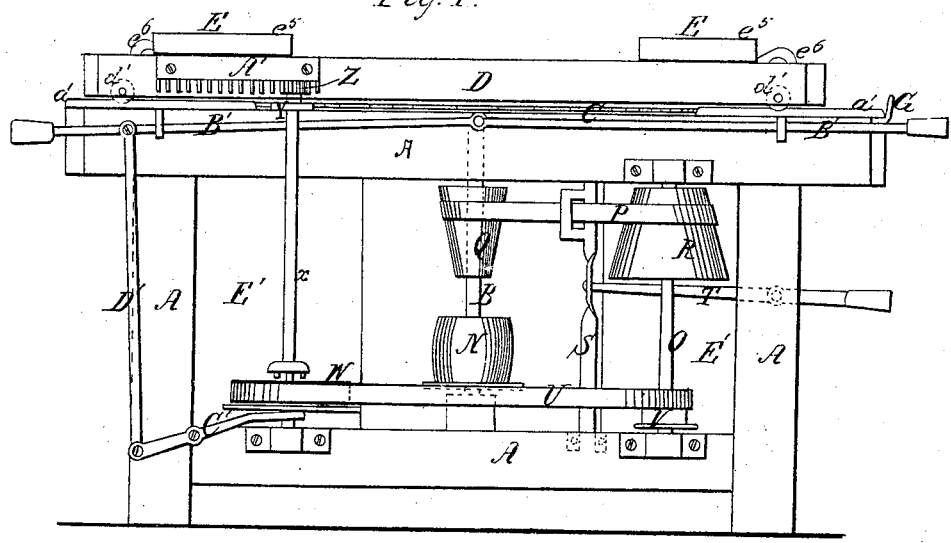
Figure 1 is a side view of my improved machine.
Figure 2:
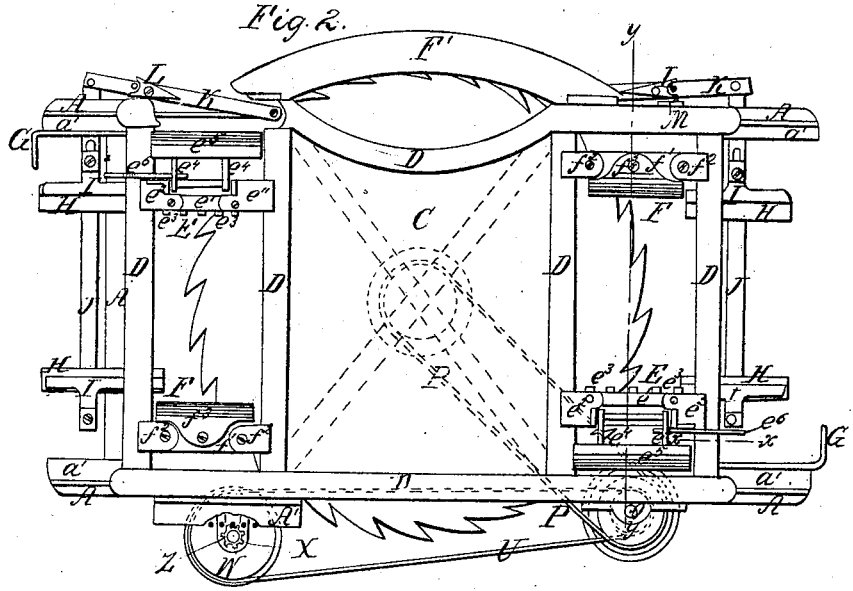
Figure 2 is a top or plan view of the same.

C is the saw, which is attached to the upper end of the shaft B, so as to work just above the top of the frame A, as shown in figs. 1, 2, and 3.

D is the carriage, to the lower side of which are pivoted wheels $d'$, which roll back and forth along rails $a'$ attached to the top of the frame A, as shown in the drawings.

At each end of the carriage D is adjustably secured a head-block, E, and a tail-block, F.

The head-blocks E consist of a bar, $e'$, provided with clamps $e^2$ at each end, by which the head-blocks are adjustably secured to ribs formed upon the carriage D, so that they may be adjusted to the length of the blocks or bolts to be sawn.

$e$ is the dog, which is a toothed bar, the ends of which slide in grooves in the under side of the bar $e'$, and which is moved back and forth by the bent levers $e^4$, the lower ends of which pass through holes in the toothed bar $e^3$, and which are pivoted at their angles to the said bar $e'$.

To the other ends of the bent levers $e^4$ is attached a weight, $e^5$, by which the said dog $e^3$ is held forward against the block to be held and sawn.

$e^6$ are bent levers, pivoted in such a position that their inner ends may rest beneath the outer ends of the bent lever $e^4$.

The outer ends of the bent levers $e^6$ project downward, so that, when the carriage D reaches the end of the machine, it may strike against the arm G attached to the frame, so as to withdraw the dog $e^3$ and allow the block or bolt to drop down upon the bed-plates.

F are the tail-blocks, consisting of a bar, $f'$, adjustably bolted to ribs formed upon the carriage D by means of the clamps $f^2$, so that they may be conveniently adjusted according to the length of the block to be sawn.

$f^3$ is a jaw pivoted to the bar $f'$ so that it may incline in one or the other direction, should the block to be sawn be accidentally cut with a beveled end.

H are the bed-plates, the frames or supports of which are adjustably attached to the frame A so that they may be adjusted according to the length of the block to be sawn.

The bed-plates H rest upon set-screws $h'$, so that they may be raised or lowered according to the required thickness of the cuts.

I are bars resting upon the bed-plates H, and which are adjustably connected with the sliding bar J, so that they may be adjusted to correspond with the adjustment of the bed-plates H.

By shifting the position of the bars I the block from which the shingles are cut is supported alternately with one end raised a little above the other, so as to cut the butts of the shingles alternately from the opposite ends of the said block, thus keeping the block level.

The bar J slides upon supports attached to the end bar of the frame A, and one of its ends passes out through a hole in the end of the side bar of the frame A, is bent upward, and is connected with the end of the lever K, the other end of which is pivoted to the upper side of said frame A, so that, as the said lever K is moved, the bars I may be moved or shifted to regulate the position of the block or bolt.

L is a catch or guide, which is made wedge-shaped, is pivoted to the upper side of the lever K, and the movement of which is limited by a stop-pin attached to the lever K, and which enters a notch in the broad end of the catch or guide L, as shown in fig. 2.

M is a pawl pivoted to the side bar of the carriage D, and which is supported, when in working position, by a stop-pin attached to the said carriage.

By this construction, as the carriage moves forward the pawl M strikes against the guide-catch L, and moves the bars I in one direction, and, as the said carriage advances the next time, the pawl M passes along the other inclined side of the said guide L, and moves the said bars I in the other direction.

When the carriage is passing back, the pawl M slides over the guide L without moving it.

The saw C is driven by a belt passing around the pulley N, attached to the saw-shaft B.

O is a vertical shaft, revolving in bearings at the side of the frame A, and to which motion is communicated from the saw-shaft B by the belt P, which passes around the cone-pulley Q, attached to said saw-shaft, and around the cone-pulley R, attached to the said shaft O.

The belt P is shifted upon the cone-pulley Q and R to regulate the rapidity of feed by the shifter S, through which it passes, and with which is connected a lever, T, pivoted to the frame A, and extending out at the end of the machine so that it may be conveniently operated, as desired.

U is a belt, passing around the pulley V attached to the shaft O, and around the pulley W revolving loosely upon the shaft X, and which is provided with a clutch, so that it may be made to carry the shaft X with it when desired.

The upper part of the shaft X works in a slotted support, Y, attached to the upper part of the frame A, and has a gear-wheel, Z, attached to its upper end, the teeth of which mesh into the teeth of the rack A', attached to the carriage D.

The rack A' is so formed that the gear-wheel Z may pass around its ends from one side to the other, so that the said gear-wheel, while moving always in the same direction, may move the carriage D back and forth alternately.

B' is a lever pivoted to the side of the frame A, and extending the whole length of said frame, so that it may be conveniently operated from either end of the machine.

C' is a lever pivoted to the frame A, in such a position that its forward end may ride upon the shaft X, beneath the clutch-pulley W, so as to throw the said pulley W into and out of gear with the shaft X whenever desired.

The rear end of the lever C' is connected with the lever B' by the connecting-bar D', so that the lever C' may be operated by operating the lever B'.

As the shingles are cut from the blocks or bolts they drop upon the inclined planes E', down which they slide and pass out at the side of the machine.

The side of the frame A and of the carriage D is recessed, to give access to the teeth of the saw C, so that the said saw-teeth may be filed and set without removing the saw from its shaft.

F' is a guard-arm, pivoted or hinged to the carriage D, so that it may be turned down to prevent anything from coming accidentally in contact with the saw C, and so that it may be turned up out of the way when the said saw-teeth are to be filed or set.

Having thus described my invention,

I claim as new and desire to secure by Letters Patent—

The combination of the bars I, sliding bar J, lever K, catch or guide L, and pawl M with each other, the bed-plates H, carriage D, and frame A, substantially as described, for setting the bolts independently of each other at both ends of the machine, as herein set forth and shown.

E. T. WHEELER.

Witnesses:
R. L. COTTON,
L. F. SHELDON.